(12) United States Patent
Aoki et al.

(10) Patent No.: US 8,301,284 B2
(45) Date of Patent: Oct. 30, 2012

(54) FEATURE EXTRACTION APPARATUS, FEATURE EXTRACTION METHOD, AND PROGRAM THEREOF

(75) Inventors: Keiko Aoki, Saitama-ken (JP); Ryuichi Kanda, Saitama-ken (JP); Keiichiro Hoashi, Saitama-ken (JP); Hiromasa Yanagihara, Saitama-ken (JP)

(73) Assignee: KDDI Corporation, Tokyo (JP)

( * ) Notice: Subject to any disclaimer, the term of this patent is extended or adjusted under 35 U.S.C. 154(b) by 505 days.

(21) Appl. No.: 12/572,135

(22) Filed: Oct. 1, 2009

(65) Prior Publication Data

US 2010/0185713 A1    Jul. 22, 2010

(30) Foreign Application Priority Data

Jan. 15, 2009    (JP) ................................. 2009-006702

(51) Int. Cl.
*G06F 17/00* (2006.01)
(52) U.S. Cl. ........................................................ 700/94
(58) Field of Classification Search .................... 700/94; 704/500–504
See application file for complete search history.

(56) References Cited

FOREIGN PATENT DOCUMENTS

| JP | 2002135122 | 5/2002 |
| JP | 2003316818 | 11/2003 |
| JP | 2008262000 | 10/2008 |
| WO | WO 2007070007 A1 * | 6/2007 |

OTHER PUBLICATIONS

Keiichiro Hoashi, et al., "Feature Space Modificaiton for Content-Based Music Retrieval Based on User Preferences", ICASSP 2006, pp. 517-520.
"What is HTK?", http://htk.eng.cam.ac.uk.
David Pye, "Content-Based Methods for the Management of Digital Music", ICASSP, Proceedings of the Acoustics, Speech, and Signal Processing, 2000 on IEEE International Conference—vol. 04, pp. 2437-2440.
Office Action received on Aug. 7, 2012 for the Japanese priority application (2009-006702).
"Voice-recognition system" Kiyohiro Shikano et al. IT Text 1st publication on May, 2012 by Ohmsha, Ltd. pp. 13-15. (in Japanese).
"Normalization of acoustic features to compensate diverse bit rates for content-based music retrieval" Shuhei Hamawaki et al., IPSJ SIG Technical Report (in Japanese).

* cited by examiner

*Primary Examiner* — Andrew C Flanders
(74) *Attorney, Agent, or Firm* — BainwoodHuang

(57) ABSTRACT

Provided are techniques which offer an advantage of reduced time and reduced storage capacity required to calculate the feature value of AAC-format song data. A feature extraction unit includes: an MDCT coefficient extraction unit which extracts MDCT coefficients from AAC-format song data; a classification unit which locates the MDCT coefficients thus extracted by the MDCT coefficient extraction unit on Mel frequency regions so as to uniformly classify the MDCT coefficients into classes, the number of which is the same as that of a predetermined number of Mel filter banks; an integrating unit which extracts the MDCT coefficients classified by the classification unit by applying a predetermined window function, and integrates the MDCT coefficients thus extracted, in increments of the Mel filter banks; and a feature calculation unit which calculates the feature value by performing logarithmic cosine conversion of the integrated results obtained by the integrating unit.

7 Claims, 7 Drawing Sheets

FEATURE EXTRACTION APPARATUS, FEATURE EXTRACTION METHOD, AND PROGRAM THEREOF

TECHNICAL FIELD

The present invention relates to a feature extraction apparatus, a feature extraction method, and a program thereof, for acquiring the feature of AAC-format song data.

BACKGROUND ART

Similarity search techniques using acoustic features are known, which allow the user to search multiple songs for a desired song. Various kinds of such techniques are being studied. In such similarity search techniques, the MFCC (Mel-Frequency Cepstrum Coefficient) known in the model learning for audio recognition is widely used as the features of the songs.

Non-patent document 1 describes a technique in which distance calculation is performed based upon the features when performing clustering using k-means. Non-patent document 2 describes a tool which is known as HTK for calculating the MFCC. Non-patent document 3 describes a method for calculating the features that correspond to the MFCC based upon the song data in the MP3 (Mpeg-1 Audio Layer-3) format.

SUMMARY OF INVENTION

Technical Problem

With the method described in Non-patent document 3, the features that correspond to the MFCC can be calculated based upon the song data in the MP3 format. However, the features that correspond to the MFCC cannot be calculated based upon the AAC (Advanced Audio Coding) format using such a method.

Furthermore, the song data formats which can be input to the HTK described in Non-patent document 2 are limited to uncompressed PCM formats such as WAVE (RIFF waveform Audio Format). Accordingly, before the features that correspond to the MFCC are obtained using the HTK, the song data must be converted to that in the uncompressed PCM format which can be input to the HTK. Accordingly, before the features that correspond to the MFCC are obtained based upon the song data in the AAC format, there is a need to convert the song data in the AAC format into that in the uncompressed PCM format. This leads to a long time being required to calculate the features that correspond to the MFCC. Furthermore, such an arrangement requires storage capacity for storing the song data in the uncompressed PCM format thus converted.

The present invention has been made in order to solve the aforementioned problem. Accordingly, it is an object to provide a feature extraction apparatus, a feature extraction method, and a program thereof, which have the advantage of reduced calculation period of time and reduced storage capacity required to calculate the features of song data in the AAC format.

Solution to Problem

In order to solve the aforementioned problem, the present invention proposes the following arrangements.

(1) The present invention proposes a feature extraction apparatus which acquires a feature value for AAC-format song data. The feature extraction apparatus includes: an MDCT coefficient extraction unit (which corresponds to an MDCT coefficient extraction unit 31 in FIG. 2, for example) which extracts MDCT coefficients from the AAC-format song data; a classification unit (which corresponds to a classification unit 32 in FIG. 2, for example) which locates the MDCT coefficients thus extracted by the MDCT coefficient extraction unit on Mel frequency regions so as to uniformly classify the MDCT coefficients into classes, the number of which is the same as that of a predetermined number of Mel filter banks; an integrating unit (which corresponds to an integrating unit 33 in FIG. 2, for example) which extracts the MDCT coefficients classified by the classification unit by applying a predetermined window function (which corresponds to the window functions for Mel regions 1 through 3 in FIG. 6, for example), and integrates the MDCT coefficients thus extracted, in increments of the Mel filter banks; and a feature calculation unit (which corresponds to a feature calculation unit 34 in FIG. 2, for example) which calculates the feature value by performing logarithmic cosine conversion of the integrated results obtained by the integrating unit.

According to the invention, a feature extraction apparatus which acquires a feature value for AAC-format song data, includes: an MDCT coefficient extraction unit which extracts MDCT coefficients from the AAC-format song data; a classification unit which locates the MDCT coefficients thus extracted by the MDCT coefficient extraction unit on Mel frequency regions so as to uniformly classify the MDCT coefficients into classes, the number of which is the same as that of a predetermined number of Mel filter banks; an integrating unit which extracts the MDCT coefficients classified by the classification unit by applying a predetermined window function, and integrates the MDCT coefficients thus extracted, in increments of the Mel filter banks; and a feature calculation unit which calculates the feature value by performing logarithmic cosine conversion of the integrated results obtained by the integrating unit.

Thus, such an arrangement is capable of acquiring a feature value of AAC-format song data without a need of converting the AAC-format song data into an uncompressed PCM format song data such as the WAVE-format song data. Such an arrangement does not require a period of time required to convert the AAC-format song data, thereby reducing a period of time required to acquire the feature value of the AAC-format song data. Furthermore, such an arrangement does not require storage capacity for storing the converted song data, thereby reducing storage capacity required to acquire the feature value of the AAC-format song data.

(2) The present invention also proposes a feature extraction apparatus described in (1). Furthermore, the classification unit includes: a Mel frequency calculation unit (which corresponds to a Mel frequency calculation unit 321 in FIG. 2, for example) which converts the sampling frequency for the AAC-format song data into a Mel scale, thereby obtaining a Mel frequency; a Mel frequency dividing unit (which corresponds to a Mel frequency dividing unit 322 in FIG. 2, for example) which divides the Mel frequency into the same number of classes as that of the Mel filter banks, and calculates the minimum value and the maximum value for each of the Mel frequencies thus divided; an original frequency calculation unit (which corresponds to an original frequency calculation unit 323 in FIG. 2, for example) which converts the minimum value and the maximum value of each Mel frequency calculated by the Mel frequency dividing unit into a linear scale, thereby obtaining the minimum value and the maximum value for each original frequency; an upper-limit frequency calculation unit (which corresponds to a Nyquist frequency calculation unit 324 in FIG. 2, for example) which calculates the upper-limit frequency (which corresponds to the Nyquist frequency described later) based upon the sampling frequency for the AAC-format song data; an upper-limit frequency dividing unit (which corresponds to a Nyquist frequency dividing unit 325 in FIG. 2, for example) which divides the upper-limit frequency calculated by the upper-limit frequency calculation unit into frequency bands, the number of which is the same as a predetermined number of filter banks; a center frequency classification unit (which corresponds to a center frequency classification unit 326 in FIG. 2, for example) which classifies the center frequencies of the frequency bands into regions each of which is defined by the minimum value and the maximum value of the original frequency, thereby classifying the center frequencies into the same number of classes as that of the Mel filter banks; and an MDCT coefficient classification unit (which corresponds to an MDCT coefficient classification unit 327 in FIG. 2, for example) which classifies the MDCT coefficients, which have been extracted by the MDCT coefficient extraction unit and the number of which is the same as that of the filter banks, into the same number of classes as that of the Mel filter banks, by associating each MDCT coefficient with a corresponding one of the center frequencies which have been classified by the center frequency classification unit into the same number of classes as that of the Mel filter banks. With such an arrangement, the integrating unit extracts the MDCT coefficients classified by the MDCT coefficient classification unit by applying the predetermined window function, and integrates the MDCT coefficients thus extracted, in increments of the Mel filter banks.

According to the invention, the classification unit includes: a Mel frequency calculation unit which converts the sampling frequency for the AAC-format song data into a Mel scale, thereby obtaining a Mel frequency; a Mel frequency dividing unit which divides the Mel frequency into the same number of classes as that of the Mel filter banks, and calculates the minimum value and the maximum value for each of the Mel frequencies thus divided; an original frequency calculation unit which converts the minimum value and the maximum value of each Mel frequency calculated by the Mel frequency dividing unit into a linear scale, thereby obtaining the minimum value and the maximum value for each original frequency; an upper-limit frequency calculation unit which calculates the upper-limit frequency based upon the sampling frequency for the AAC-format song data; an upper-limit frequency dividing unit which divides the upper-limit frequency calculated by the upper-limit frequency calculation unit into frequency bands, the number of which is the same as a predetermined number of filter banks; a center frequency classification unit which classifies the center frequencies of the frequency bands into regions each of which is defined by the minimum value and the maximum value of the original frequency, thereby classifying the center frequencies into the same number of classes as that of the Mel filter banks; and an MDCT coefficient classification unit which classifies the MDCT coefficients, which have been extracted by the MDCT coefficient extraction unit and the number of which is the same as the filter banks, into the same number of classes as that of the Mel filter banks, by associating each MDCT coefficient with a corresponding one of the center frequencies which have been classified by the center frequency classification unit into the same number of classes as that of the Mel filter banks. With such an arrangement, the integrating unit extracts the MDCT coefficients classified by the MDCT coefficient classification unit by applying the predetermined window function, and integrates the MDCT coefficients thus extracted, in increments of the Mel filter banks.

With such an arrangement, the classification unit locates the MDCT coefficients extracted by the MDCT coefficient extraction unit on the Mel frequency regions so as to classify into classes, the number of which is the same as that of a predetermined number of Mel filter banks, by means of the Mel frequency calculation unit, the Mel frequency dividing unit, the original frequency calculation unit, the upper-limit frequency calculation unit, the upper limit frequency dividing unit, the center frequency classification unit, and the MDCT coefficient classification unit.

(3) The present invention also proposes a feature extraction apparatus described in (1), wherein the MDCT coefficient extraction unit performs processing in which the MDCT coefficients are extracted from the AAC-format song data, which is a part of multiple processing for converting the AAC-format song data into uncompressed PCM-format song data.

According to the invention, the MDCT coefficient extraction unit performs processing in which the MDCT coefficients are extracted from the AAC-format song data, which is a part of multiple processing for converting the AAC-format song data into uncompressed PCM-format song data.

With such an arrangement, at the point in time immediately after the extraction of the MDCT coefficients for the AAC-format song data, the processing is started by the classification unit, the integrating unit, and the feature calculation unit. Thus, such an arrangement has the advantage of reduced time required to acquire the feature value for the AAC-format song data, as compared with conventional techniques in which the entire series of processing must be performed for converting the AAC-format song data into uncompressed PCM-format song data. Furthermore, with the MDCT coefficient extraction unit, the AAC-format song data is not converted into the PCM-format song data. Thus, such an arrangement does not require storage capacity for storing the converted song data, thereby reducing storage capacity required to acquire the feature value for the AAC-format song data.

(4) The present invention also proposes a feature extraction apparatus described in (1), wherein, after each of the MDCT coefficients classified by the MDCT coefficient classification unit is multiplied by a predetermined coefficient so as to perform high-frequency enhancement, the integrating unit extracts the MDCT coefficients thus subjected to the high-frequency enhancement by applying the predetermined window function, and integrates the MDCT coefficients thus extracted, in increments of the Mel filter banks.

According to the present invention, after each of the MDCT coefficients classified by the MDCT coefficient classification unit is multiplied by a predetermined coefficient so as to perform high-frequency enhancement, the integrating unit extracts the MDCT coefficients thus subjected to the high-frequency enhancement by applying the predetermined window function, and integrates the MDCT coefficients thus extracted, in increments of the Mel filter banks.

In conventional techniques, high-frequency enhancement is performed by taking the moving average. However, such high-frequency enhancement requires the song data in an uncompressed PCM format. On the other hand, with the present invention, high-frequency enhancement is performed by multiplying each MDCT coefficient by a predetermine coefficient. Thus, such high-frequency enhancement does not require the uncompressed PCM format song data. Thus, such an arrangement is capable of providing high-frequency enhancement without converting the AAC-format song data into the uncompressed PCM format song data. Such an arrangement provides a high-precision feature value as compared with an arrangement in which the high-frequency enhancement is not performed.

(5) The present invention also proposes a feature database creating apparatus including: a feature extraction apparatus described in (1); a song data storage unit (which corresponds to a song database 21 in FIG. 1, for example) which stores multiple song data in the AAC format; and a feature storage unit (which corresponds to a feature extraction unit 22 and a song feature database 23 in FIG. 1, for example) which obtains the feature value of each of multiple AAC-format song data stored in the song data storage unit, and stores the feature values thus obtained.

According to the invention, a feature database creating apparatus includes; the aforementioned feature extraction apparatus; a song data storage unit which stores multiple song data in the AAC format; and a feature storage unit which obtains the feature value of each of multiple AAC-format song data stored in the song data storage unit, and stores the feature values thus obtained.

Thus, such an arrangement is capable of storing the feature value in the feature storage unit for each of the multiple AAC-format song data stored in the song data storage unit.

(6) The present invention also proposes a song search system including: a song data selection receiving unit (which corresponds to a terminal 10 in FIG. 1, for example) which receives the song data selected by the user from among multiple AAC-format song data stored in a song data storage unit; a feature vector creating unit (which corresponds to a feature extraction unit 22 in FIG. 1, for example) which calculates a feature vector for a feature value stored in a feature storage unit; a specific feature vector search unit (which corresponds to a song search unit 24 in FIG. 1, for example) which searches the feature vectors obtained by the feature vector creating unit for a specific feature vector in which the distance between the feature vector thereof and the feature vector of the song data which has been selected and received by the song data selection receiving unit is equal to or smaller than a predetermined value; a song search unit (which corresponds to a song search unit 24 in FIG. 1, for example) which searches multiple AAC-format song data stored in the song data storage unit for the song data in which the feature vector thereof matches the specific feature vector; and a feature database creating apparatus provided with: the song data storage unit (which corresponds to a song database 21 in FIG. 1, for example) which stores multiple song data in the AAC format; and the feature storage unit (which corresponds to a feature extraction unit 22 and a song feature database 23 in FIG. 1, for example) which obtains the feature value of each of multiple AAC-format song data stored in the song data storage unit, and stores the feature values thus obtained; wherein, a feature database creating apparatus comprising a feature extraction apparatus provided with: an MDCT coefficient extraction unit (which corresponds to an MDCT coefficient extraction unit 31 in FIG. 2, for example) which extracts MDCT coefficients from a AAC-format song data; a classification unit (which corresponds to a classification unit 32 in FIG. 2, for example) which locates the MDCT coefficients thus extracted by the MDCT coefficient extraction unit on Mel frequency regions so as to uniformly classify the MDCT coefficients into classes, the number of which is the same as that of a predetermined number of Mel filter banks; an integrating unit (which corresponds to an integrating unit 33 in FIG. 2, for example) which extracts the MDCT coefficients classified by the classification unit by applying a predetermined window function (which corresponds to the window functions for Mel regions 1 through 3 in FIG. 6, for example), and integrates the MDCT coefficients thus extracted, in increments of the Mel filter banks; and a feature calculation unit (which corresponds to a feature calculation unit 34 in FIG. 2, for example) which calculates the feature value by performing logarithmic cosine conversion of the integrated results obtained by the integrating unit.

According to the invention, a song search system includes: the aforementioned feature database creating apparatus; a song data selection receiving unit which receives the song data selected by the user from among multiple AAC-format song data stored in the song data storage unit; a feature vector creating unit which calculates a feature vector for the feature value stored in the feature storage unit; a specific feature vector search unit which searches the feature vectors obtained by the feature vector creating unit for a specific feature vector in which the distance between the feature vector thereof and the feature vector of the song data which has been selected and received by the song data selection receiving unit is equal to or smaller than a predetermined value; and a song search unit which searches multiple AAC-format song data stored in the song data storage unit for the song data in which the feature vector thereof matches the specific feature vector.

Thus, such an arrangement is capable of searching multiple AAC-format song data stored in the song data storage unit for song data in which the distance between the feature vector thereof and the feature vector of the song data selected by the user is equal to or smaller than a predetermined value.

(7) The present invention also proposes a feature extraction method for acquiring a feature value for AAC-format song data. The feature extraction method includes: a first step (which corresponds to Step S1 in FIG. 4, for example) for extracting MDCT coefficients from the AAC-format song data; a second step (which corresponds to Steps S2 through S8 in FIG. 4, for example) for locating the MDCT coefficients thus extracted in the first step on Mel frequency regions so as to uniformly classify the MDCT coefficients into classes, the number of which is the same as that of a predetermined number of Mel filter banks; a third step (which corresponds to Step S9 in FIG. 4, for example) for extracting the MDCT coefficients classified in the second step by applying a predetermined window function (which corresponds to the window functions for the Mel bands 1 through 3 shown in FIG. 6, for example), and integrating the MDCT coefficients thus extracted, in increments of the Mel filter banks; and a fourth step (which corresponds to Step S10 in FIG. 4, for example) for calculating the feature value by performing logarithmic cosine conversion of the integrated results obtained in the third step.

According to the invention, the MDCT coefficients are extracted from the AAC-format song data, and the MDCT coefficients thus extracted are located on Mel frequency regions so as to uniformly classify the MDCT coefficients into classes, the number of which is the same as that of a predetermined number of Mel filter banks. Subsequently, the MDCT coefficients thus classified are extracted by applying a predetermined window function, and the MDCT coefficients thus extracted are integrated, in increments of the Mel filter banks. Furthermore, logarithmic cosine conversion is performed for the integrated results thus obtained, thereby calculating the feature value. Thus, such an arrangement provides the same advantages as those described above.

(8) The present invention also proposes a feature extraction method described in (7), wherein the second step includes: a fifth step (which corresponds to Step S2 in FIG. 4, for example) for converting the sampling frequency for the AAC-format song data into a Mel scale, thereby obtaining a Mel frequency; a sixth step (which corresponds to Step S3 in FIG.

4, for example) for dividing the Mel frequency into the same number of classes as that of the Mel filter banks, and calculating the minimum value and the maximum value for each of the Mel frequencies thus divided; a seventh step (which corresponds to Step S4 in FIG. 4, for example) for converting the minimum value and the maximum value of each Mel frequency calculated in the sixth step into a linear scale, thereby obtaining the minimum value and the maximum value for each original frequency; an eighth step (which corresponds to Step S5 in FIG. 4, for example) for calculating the upper-limit frequency (which corresponds to the Nyquist frequency described later) based upon the sampling frequency for the AAC-format song data; a ninth step (which corresponds to Step S6 in FIG. 4, for example) for uniformly dividing the upper-limit frequency calculated in the eighth step into frequency bands, the number of which is the same as a predetermined number of filter banks; a tenth step (which corresponds to Step S7 in FIG. 4, for example) for classifying the center frequencies of the frequency bands into regions each of which is defined by the minimum value and the maximum value of the original frequency, thereby classifying the center frequencies into the same number of classes as that of the Mel filter banks; and an eleventh step (which corresponds to Step S8 in FIG. 4, for example) for classifying the MDCT coefficients, which have been extracted in the first step and the number of which is the same as the filter banks, into the same number of classes as that of the Mel filter banks, by associating each MDCT coefficient with a corresponding one of the center frequencies which have been classified in the tenth step into the same number of classes as that of the Mel filter banks. Furthermore, in the third step, the MDCT coefficients classified in the eleventh step are extracted by applying the predetermined window function, and the MDCT coefficients thus extracted are integrated, in increments of the Mel filter banks.

According to the invention, in the step for locating the MDCT coefficients extracted from the AAC-format song data on Mel frequency regions so as to uniformly classify the MDCT coefficients into classes, the number of which is the same as that of a predetermined number of Mel filter banks, the sampling frequency for the AAC-format song data is converted into a Mel scale, thereby obtaining a Mel frequency. Furthermore, the Mel frequency thus obtained is divided into the same number of regions as that of the Mel filter banks, and the minimum value and the maximum value are calculated for each of the Mel frequencies thus divided. Subsequently, the minimum value and the maximum value of each Mel frequency thus calculated is converted into a linear scale, thereby obtaining the minimum value and the maximum value for each original frequency. Furthermore, the upper-limit frequency is calculated based upon the sampling frequency for the AAC-format song data, and the upper-limit frequency thus calculated is divided into frequency bands, the number of which is the same as a predetermined number of filter banks. Subsequently, the center frequencies of the frequency bands are classified into regions each of which is defined by the minimum value and the maximum value of the original frequency, thereby classifying the center frequencies into the same number of classes as that of the Mel filter banks. Furthermore, the MDCT coefficients, the number of which is the same as the filter banks, are classified into the same number of classes as that of the Mel filter banks, by associating each MDCT coefficient with a corresponding one of the center frequencies which have been classified into the same number of classes as that of the Mel filter banks. Thus, such an arrangement provides the same advantages as those described above.

(9) The present invention also proposes a program which instructs a computer to execute a feature extraction method for acquiring a feature value for AAC-format song data. The program includes: a first step (which corresponds to Step S1 in FIG. 4, for example) for extracting MDCT coefficients from the AAC-format song data; a second step (which corresponds to Steps S2 through S8 in FIG. 4, for example) for locating the MDCT coefficients thus extracted in the first step on Mel frequency regions so as to uniformly classify the MDCT coefficients into classes, the number of which is the same as that of a predetermined number of Mel filter banks; a third step (which corresponds to Step S9 in FIG. 4, for example) for extracting the MDCT coefficients classified in the second step by applying a predetermined window function (which corresponds to the window functions for the Mel bands 1 through 3 in FIG. 6, for example), and integrating the MDCT coefficients thus extracted, in increments of the Mel filter banks; and a fourth step (which corresponds to Step S10 in FIG. 4, for example) for calculating the feature value by performing logarithmic cosine conversion of the integrated results obtained in the third step.

According to the invention, by instructing a computer to execute a program, the MDCT coefficients are extracted from the AAC-format song data, and the MDCT coefficients thus extracted are located on Mel frequency regions so as to uniformly classify the MDCT coefficients into classes, the number of which is the same as that of a predetermined number of Mel filter banks. Subsequently, the MDCT coefficients thus classified are extracted by applying a predetermined window function, and the MDCT coefficients thus extracted are integrated, in increments of the Mel filter banks. Furthermore, logarithmic cosine conversion is performed for the integrated results thus obtained, thereby calculating the feature value. Thus, such an arrangement provides the same advantages as those described above.

(10) The present invention also proposes a program described in (9), wherein the second step includes: a fifth step (which corresponds to Step S2 in FIG. 4, for example) for converting the sampling frequency for the AAC-format song data into a Mel scale, thereby obtaining a Mel frequency; a sixth step (which corresponds to Step S3 in FIG. 4, for example) for dividing the Mel frequency into the same number of classes as that of the Mel filter banks, and calculating the minimum value and the maximum value for each of the Mel frequencies thus divided; a seventh step (which corresponds to Step S4 in FIG. 4, for example) for converting the minimum value and the maximum value of each Mel frequency calculated in the sixth step into a linear scale, thereby obtaining the minimum value and the maximum value for each original frequency; an eighth step (which corresponds to Step S5 in FIG. 4, for example) for calculating the upper-limit frequency (which corresponds to the Nyquist frequency described later) based upon the sampling frequency for the AAC-format song data; a ninth step (which corresponds to Step S6 in FIG. 4, for example) for uniformly dividing the upper-limit frequency calculated in the eighth step into frequency bands, the number of which is the same as a predetermined number of filter banks; a tenth step (which corresponds to Step S7 in FIG. 4, for example) for classifying the center frequencies of the frequency bands into regions each of which is defined by the minimum value and the maximum value of the original frequency, thereby classifying the center frequencies into the same number of classes as that of the Mel filter banks; and an eleventh step (which corresponds to Step S8 in FIG. 4, for example) for classifying the MDCT coefficients, which have been extracted in the first step and the number of which is the same as the filter banks, into the same number of classes as that of the Mel filter banks, by associating each MDCT coefficient with a corresponding one of the center frequencies which have been classified in the tenth step into the same number of classes as that of the Mel filter banks. Furthermore, in the third step, the MDCT coefficients classified in the eleventh step are extracted by applying the predetermined window function, and the MDCT coefficients thus extracted are integrated, in increments of the Mel filter banks.

According to the invention, by instructing a computer to execute a program, in the step for locating the MDCT coefficients extracted from the AAC-format song data on Mel frequency regions so as to uniformly classify the MDCT coefficients into classes, the number of which is the same as that of a predetermined number of Mel filter banks, the sampling frequency for the AAC-format song data is converted into a Mel scale, thereby obtaining a Mel frequency. Furthermore, the Mel frequency thus obtained is divided into the same number of regions as that of the Mel filter banks, and the minimum value and the maximum value are calculated for each of the Mel frequencies thus divided. Subsequently, the minimum value and the maximum value of each Mel frequency thus calculated is converted into a linear scale, thereby obtaining the minimum value and the maximum value for each original frequency. Furthermore, the upper-limit frequency is calculated based upon the sampling frequency for the AAC-format song data, and the upper-limit frequency thus calculated is divided into frequency bands, the number of which is the same as a predetermined number of filter banks. Subsequently, the center frequencies of the frequency bands are classified into regions each of which is defined by the minimum value and the maximum value of the original frequency, thereby classifying the center frequencies into the same number of classes as that of the Mel filter banks. Furthermore, the MDCT coefficients, the number of which is the same as the filter banks, are classified into the same number of classes as that of the Mel filter banks, by associating each MDCT coefficient with a corresponding one of the center frequencies which have been classified into the same number of classes as that of the Mel filter banks. Thus, such an arrangement provides the same advantages as those described above.

ADVANTAGEOUS EFFECTS OF INVENTION

With the present invention, the feature value of AAC-format song data can be acquired without converting the AAC-format song data into uncompressed-PCM-format song data such as WAVE-format song data. Thus, such an arrangement does not require time required to convert the AAC-format song data, thereby reducing time required to acquire the feature value of the AAC-format song data. Furthermore, such an arrangement does not require storage capacity for storing the converted song data, thereby reducing storage capacity required to acquire the feature value of the AAC-format song data.

DESCRIPTION OF EMBODIMENTS

Description will be made below regarding an embodiment of the present invention with reference to the drawings. It should be noted that the components in the following embodiment can be replaced by other existing components as appropriate. Also, various modifications may be made by making a combination of such components and other existing components. Accordingly, the present invention is by no means intended to be restricted to the embodiment described below.
[Configuration of Song Search System]

Figure 1:
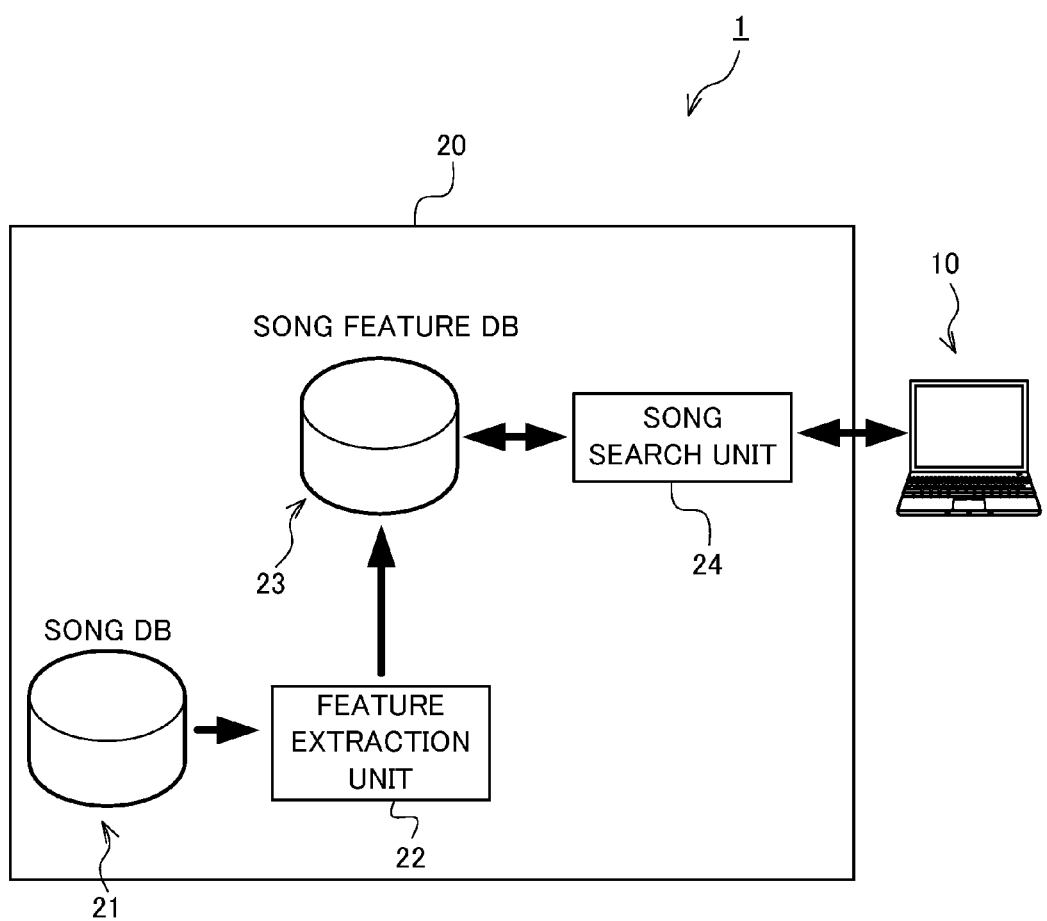
FIG. 1 is a diagram which shows the configuration of a song search system according to an embodiment of the present invention.

FIG. 1 is a diagram which shows the configuration of a song search system 1 according to an embodiment of the present invention. The song search system 1 includes: a terminal 10 for the user to operate; and a song search apparatus 20 provided communicably with the terminal 10. The song search apparatus 20 includes a song database 21, a feature extraction unit 22, a song feature database 23, and a song search unit 24.

The song database 21 stores multiple song data in the AAC format. The feature extraction unit 22 calculates AACCEP which is the feature value that corresponds to the MFCC, for each song data stored in the form of the AAC format in the song database 21. Subsequently, the feature extraction unit 22 calculates the feature vector by performing tree-vector quantization processing for the AACCEP thus calculated. The feature extraction unit 22 instructs the song feature database 23 to store the feature vector thus calculated.

The song search unit 24 searches for a song similar to the song data selected by the user, based upon the feature vectors stored in the song feature database 23. Specifically, first, the song search unit 24 transmits information to the terminal 10 so as to prompt the user to select one from among multiple song data stored in the AAC format in the song database 21. Subsequently, upon receiving, from the terminal 10, the information with respect to the song data thus selected by the user, the song search unit 24 searches the feature vectors stored in the song feature database 23 for a feature vector in which the distance between the feature vector thereof and the feature vector of the song data thus selected is equal to or smaller than a predetermined value. Furthermore, the song search unit 24 searches the multiple song data stored in the AAC format in the song database 21 for the song data that corresponds to the feature vector thus detected. Such an arrangement is capable of searching multiple song data stored in the AAC format in the song database 21 for the song data in which the distance between the feature vector thereof and that of the song data selected by the user is equal to or smaller than a predetermined value, i.e., the song data which is similar to the song data selected by the user.
[Configuration of Feature Extraction Unit]

Figure 2:
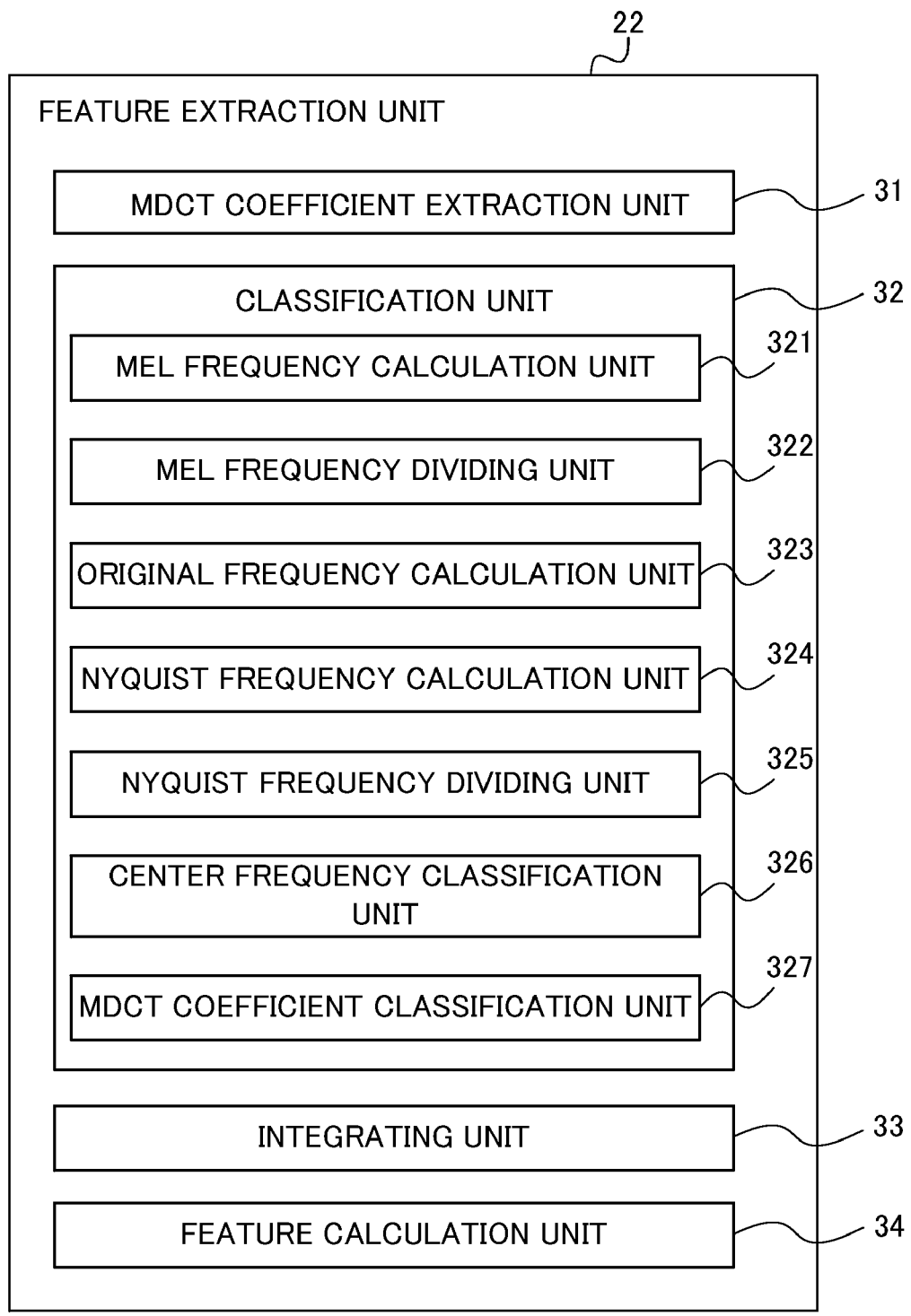
FIG. 2 is a diagram which shows the configuration of a feature extraction unit included in the song search system.

FIG. 2 is a block diagram which shows the configuration of the feature extraction unit 22. The feature extraction unit 22 includes an MDCT coefficient extraction unit 31, a classification unit 32, an integrating unit 33, and a feature calculation unit 34.

The MDCT coefficient extraction unit 31 extracts the MDCT coefficients from the song data stored in the AAC format in the song database 21. Description will be made with reference to FIG. 3 regarding the processing performed by the MDCT coefficient extraction unit 31.

Figure 3:
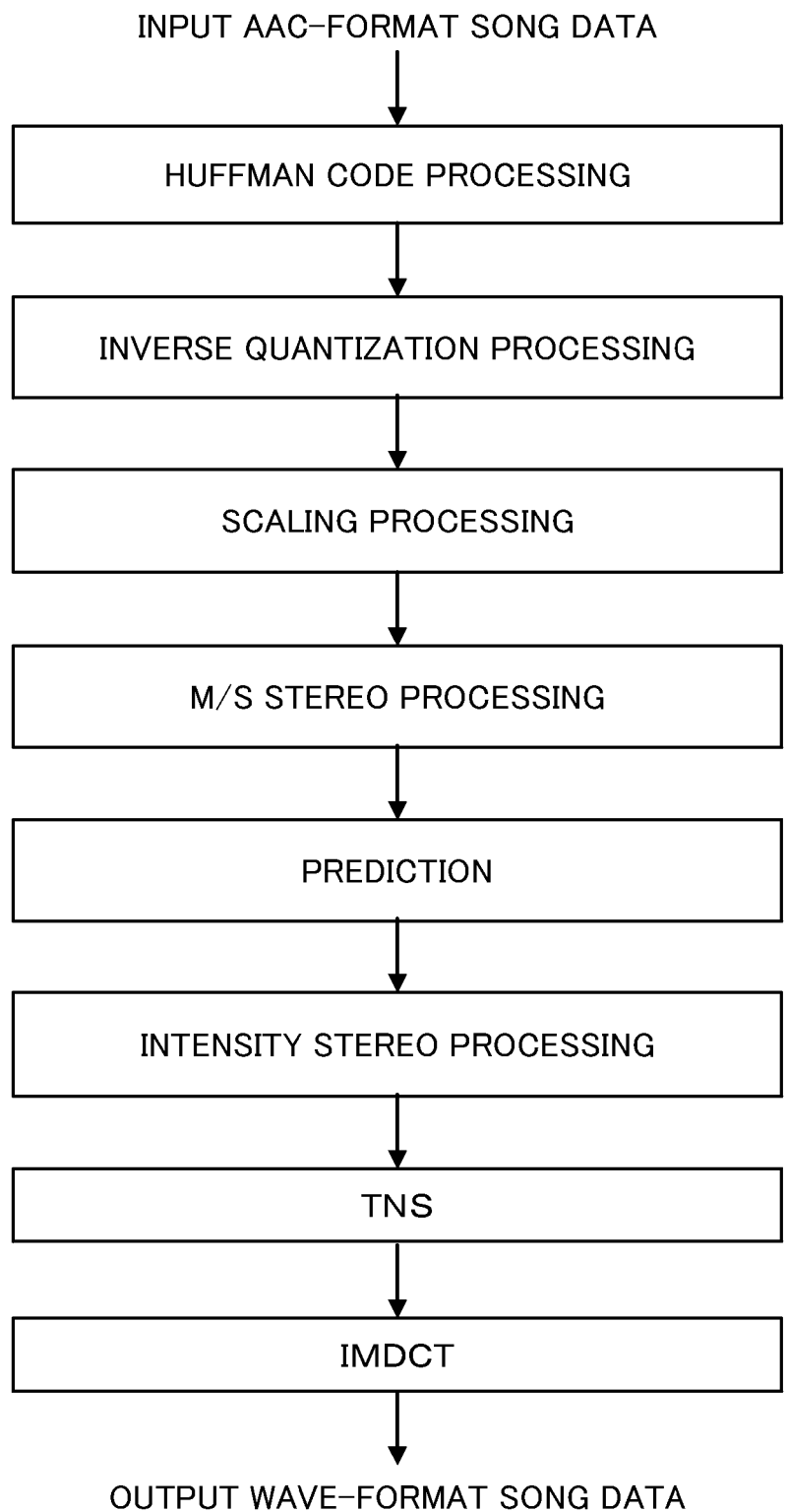
FIG. 3 is a diagram for describing the processing performed by an MDCT coefficient extraction unit included in the feature extraction unit.

FIG. 3 shows a series of processing for converting the song data in the AAC format into song data in the WAVE format which is an uncompressed PCM format.

In this processing, first, processing is performed for Huffman codes so as to decode the Huffman codes. Next, inverse quantization processing is performed. Subsequently, scaling processing is performed so as to integrate the scale factor bands. Subsequently, M/S stereo processing is performed so as to convert the sum signal and the difference signal into the left signal and the right signal. Next, prediction processing is performed so as to convert the predicted difference, which was predicted using the MDCT coefficient linear prediction, into an original value. Next, intensity stereo processing is performed so as to convert the left/right signals, which have been coded so as to be reduced to only a monaural signal and localization information, into the original left/right signals. Subsequently, TNS processing is performed so as to adjust the noise level which occurred due to compression processing, according to the sound level. Next, IMDCT processing is performed so as to convert the frequency spectrum into a time-based signal.

Here, the MDCT coefficients of the AAC format song data can be extracted by performing a series of processes, from the Huffman code processing up to the TNS processing, which is a part of the series of processing shown in FIG. 3. Accordingly, of the series of processing shown in FIG. 3, the MDCT coefficient extraction unit 31 only performs such a series of processes from the Huffman code processing up to the TNS processing, and does not perform the IMDCT processing after the extraction of the MDCT coefficients for the AAC-format song data thus input.

The classification unit 32 locates the MDCT coefficients thus extracted by the MDCT coefficient extraction unit 31 on Mel frequency regions, i.e., classifies the MDCT coefficients into the same number of classes as that of the Mel filter banks. The classification unit 32 includes a Mel frequency calculation unit 321, a Mel frequency dividing unit 322, an original frequency calculation unit 323, a Nyquist frequency calculation unit 324, a Nyquist frequency dividing unit 325, a center frequency classification unit 326, and an MDCT coefficient classification unit 327.

The Mel frequency calculation unit 321 converts the sampling frequency for the AAC format song data, from which the MDCT coefficients have been extracted, into a Mel scale, thereby obtaining the Mel frequency. The Mel frequency dividing unit 322 divides the Mel frequency into the same number of regions as that of the Mel filter banks, and calculates the minimum value and the maximum value of the Mel frequency for each region thus divided. The original frequency calculation unit 323 converts the minimum value and the maximum value of each Mel frequency into those in the linear scale, thereby obtaining the maximum value and the minimum value for each original frequency. The Nyquist frequency calculation unit 324 calculates the Nyquist frequency as the upper-limit frequency, based upon the sampling frequency for the AAC format from which the MDCT coefficients have been extracted.

The Nyquist frequency dividing unit 325 uniformly divides the Nyquist frequency thus calculated by the Nyquist frequency calculation unit 324 into the same number of frequency bands as a predetermined number of filter banks. The center frequency classification unit 326 classifies the center frequency of each frequency band thus divided by the Nyquist frequency dividing unit 325 into regions each of which is defined by the minimum value and the maximum value of the original frequency, thereby classifying the center frequencies into the same number of classes as that of the Mel filter banks. The MDCT coefficient classification unit 327 classifies the same number of MDCT coefficients as that of the filter banks, which have been extracted by the MDCT coefficient extraction unit 31, into the same number of classes as that of the Mel filter banks, by associating each MDCT coefficient with the corresponding one of the center frequencies thus classified into the same number of classes as that of the Mel filter banks.

The integrating unit 33 performs high-frequency enhancement by multiplying each of the MDCT coefficients thus classified by the MDCT coefficient classification unit 327 by a predetermined coefficient, following which the integrating unit 33 extracts the MDCT coefficients by applying a predetermined window function, described later, to the MDCT coefficients thus subjected to the high-frequency enhancement, and integrates the MDCT coefficients thus extracted, in increments of the Mel filter banks.

In conventional techniques, the high-frequency enhancement is performed by taking the moving average of the time-based waveform of the song data in the uncompressed PCM format. Specifically, with the song data in the uncompressed PCM format at a sampling point in time t as $P(t)$, the high-frequency enhancement is performed by applying a moving-average filter with the coefficients of 1.0 and −0.97 to the song data $P(t)$ in the uncompressed PCM format, as represented by the following Expression (1).

[Expression 1]

$$P(t)'=P(t)-0.97P(t-1) \quad (1)$$

On the other hand, with the j'th MDCT coefficient as $M(j)$, the integrating unit 33 performs high-frequency enhancement by multiplying the MDCT coefficient $M(j)$ by a predetermined coefficient as represented by the following Expression (2). Here, j is an integer which satisfies the following Expression: $1 \leq j \leq 1024$.

[Expression 2]

$$M'(j)=\sin((\pi/2/1024)j)M(j) \quad (2)$$

It should be noted that the integrating unit 33 may perform high-frequency enhancement by multiplying the MDCT coefficient $M(j)$ by a predetermined coefficient as represented by the following Expression (3), instead of the calculation represented by the Expression (2).

[Expression 3]

$$M'(j)=\alpha\cdot\sin((\pi/2/1024)j)M(j)+(1-\alpha)M(j) \quad (3)$$

The feature calculation unit 34 calculates the feature value by performing logarithmic cosine conversion of the integrated results obtained by the integrator unit.

[Feature Extraction Processing by Feature Extraction Unit]

Figure 4:
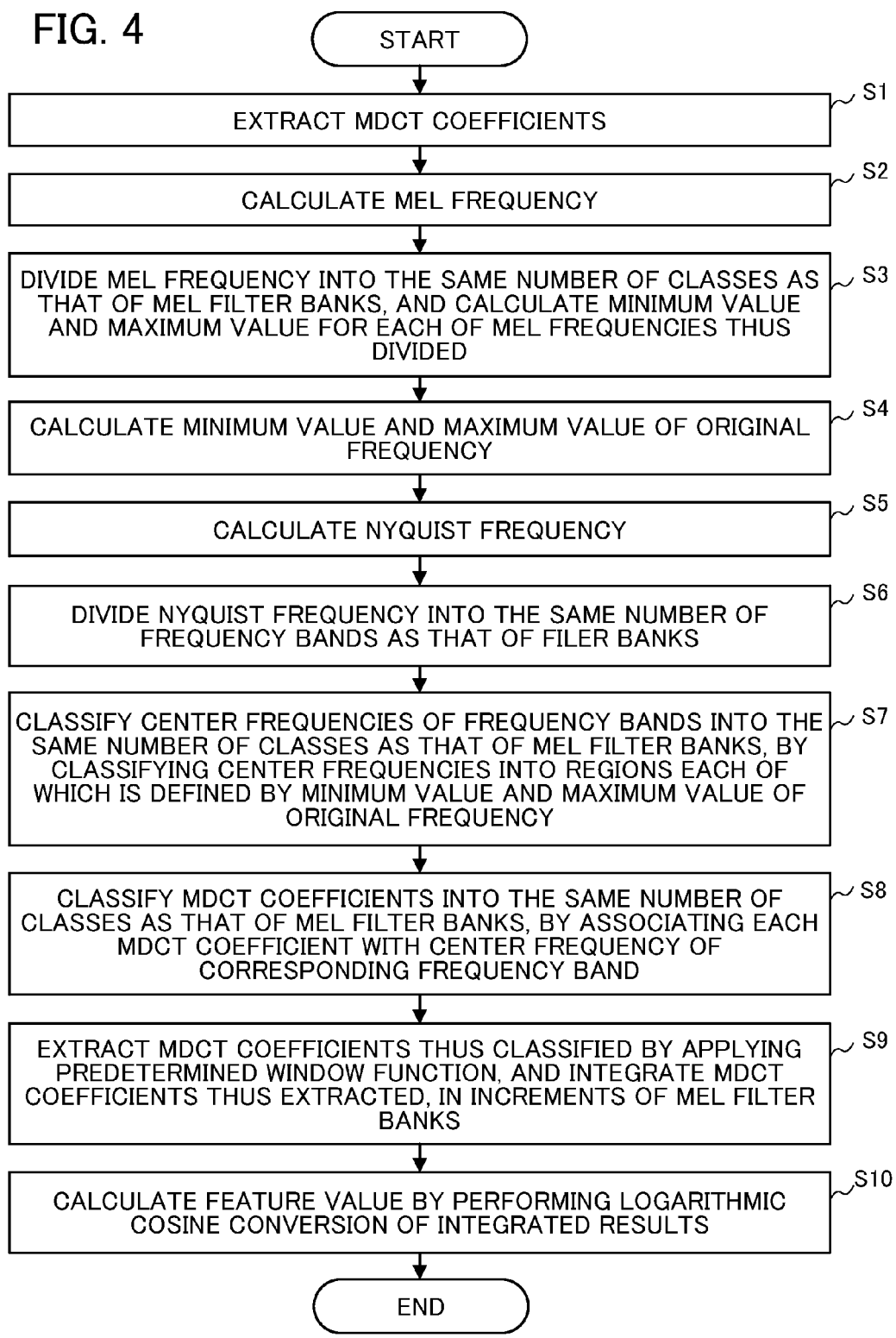
FIG. 4 is a diagram which shows the processing performed by the feature extraction unit.

Description will be made below with reference to the flowchart shown in FIG. 4 regarding a procedure performed by the feature extraction unit 22 for selecting one song data (which will be referred to as "target song data" hereafter) from among multiple song data stored in the AAC format in the song database 21.

It should be noted that description will be made below regarding an arrangement in which the sampling frequency f for the target song data is 22050 Hz, the number of the Mel filter banks is 12, and the number of the filter banks is 1024.

In Step S1, the MDCT coefficient extraction unit 31 extracts the MDCT coefficients from the target song data. Specifically, the target song data is read out from the song database 21, and a series of processing from the Huffman code processing up to the TNS processing is performed, which is a part of the series of processing shown in FIG. 3, so as to extract the MDCT coefficients.

In Step S2, the Mel frequency calculation unit 321 included in the classification unit 32 converts the sampling frequency f for the target song data into a Mel scale, thereby obtaining the Mel frequency fm. Here, the Mel frequency $f_m$ is calculated using the following Expression (4). By substituting the sampling frequency f=22050 Hz into the Expression (4), the Mel frequency $f_m$=3923.337 Hz is obtained.

[Expression 4]

$$f_m = 2595 \cdot \log_{10}\left(1 + \frac{f}{700}\right) \quad (4)$$

In Step S3, the Mel frequency dividing unit 322 included in the classification unit 32 divides the Mel frequency $f_m$ into twelve regions, the same as the number of the Mel filter banks. Furthermore, the Mel frequency dividing unit 322 calculates the minimum value (MIN), the median (MID), and the maximum value (MAX) for each of the Mel frequencies thus divided. The calculation results obtained by this processing are shown in Table 1. It should be noted that, as shown in Table 1, the bands of the Mel frequencies thus divided into 12 regions will be referred to as "Mel bands 1 through 12" hereafter.

TABLE 1

| MEL BAND | MEL FREQUENCY (MIN) [Hz] | MEL FREQUENCY (MID) [Hz] | MEL FREQUENCY (MAX) [Hz] |
| --- | --- | --- | --- |
| 1 | 0.000 | 163.472 | 490.417 |
| 2 | 163.472 | 490.417 | 817.362 |
| 3 | 490.417 | 817.362 | 1144.307 |
| 4 | 817.362 | 1144.307 | 1471.251 |
| 5 | 1144.307 | 1471.251 | 1798.196 |
| 6 | 1471.251 | 1798.196 | 2125.141 |
| 7 | 1798.196 | 2125.141 | 2452.086 |
| 8 | 2125.141 | 2452.086 | 2779.031 |
| 9 | 2452.086 | 2779.031 | 3105.975 |
| 10 | 2779.031 | 3105.975 | 3432.920 |
| 11 | 3105.975 | 3432.920 | 3759.865 |
| 12 | 3432.920 | 3759.865 | 4086.810 |

In Step S4, the original frequency calculation unit 323 included in the classification unit 32 converts the maximum value (MIN), the median (MID), and the maximum value (MAX) thus calculated in Step S3 into the linear scale, thereby obtaining a minimum value $K_{lo}$, a median $k_c$, and a maximum value $k_{hi}$ for each of the original frequencies. The conversion results obtained by this processing are shown in Table 2.

TABLE 2

| MEL BAND | ORIGINAL FREQUENCY $k_{lo}$ [Hz] | ORIGINAL FREQUENCY $k_c$ [Hz] | ORIGINAL FREQUENCY $k_{hi}$ [Hz] |
| --- | --- | --- | --- |
| 1 | 0.000 | 109.270 | 381.642 |
| 2 | 109.270 | 381.642 | 745.685 |
| 3 | 381.642 | 745.685 | 1232.253 |

TABLE 2-continued

| MEL BAND | ORIGINAL FREQUENCY $k_{lo}$ [Hz] | ORIGINAL FREQUENCY $k_c$ [Hz] | ORIGINAL FREQUENCY $k_{hi}$ [Hz] |
| --- | --- | --- | --- |
| 4 | 745.685 | 1232.253 | 1882.583 |
| 5 | 1232.253 | 1882.583 | 2751.792 |
| 6 | 1882.583 | 2751.792 | 3913.546 |
| 7 | 2751.792 | 3913.546 | 5466.307 |
| 8 | 3913.546 | 5466.307 | 7541.674 |
| 9 | 5466.307 | 7541.674 | 10315.538 |
| 10 | 7541.674 | 10315.538 | 14022.989 |
| 11 | 10315.538 | 14022.989 | 18978.240 |
| 12 | 14022.989 | 18978.240 | 25601.259 |

It should be noted that the minimum value $K_{lo}$, the median k, and the maximum value $k_{hi}$ for the original frequency satisfy the following Expression (5). Here, "l" represents the identification number of the Mel band, and is assumed so as to satisfy the following Expression: $1 \leq l \leq 12$.

[Expression 5]

$$k_c(l) = k_{hi}(l-1) = k_{lo}(l+1) \quad (5)$$

Figure 5:
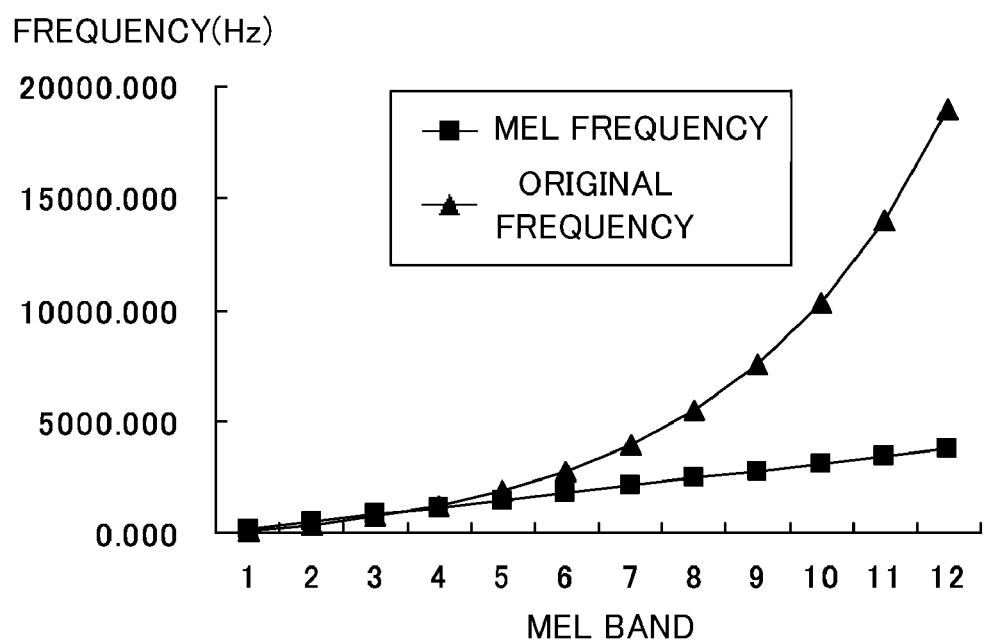
FIG. 5 is a diagram which shows the relation between the Mel frequency calculated by the feature extraction unit and the original frequency.

Here, FIG. 5 shows the relation between the median (MID) calculated in Step S3 for each of the twelve Mel frequencies and the median $k_c$ obtained in Step S4 for each of twelve original frequencies thus calculated. As shown in FIG. 5, as compared with the Mel frequency, the band width of the original frequency is rapidly increased according to an increase in the identification number of the Mel band, i.e., according to an increase in the frequency.

In Step S5, the Nyquist frequency calculation unit 324 included in the classification unit 32 calculates the Nyquist frequency $f_n$ based upon the sampling frequency f for the target song data. Here, the Nyquist frequency $f_n$ is calculated using the following Expression (6). By substituting the sampling frequency f=22050 Hz into this Expression (6), the Nyquist frequency $f_n$=11025 Hz is obtained.

[Expression 6]

$$f_n = \frac{f}{2} \quad (6)$$

In Step S6, the Nyquist frequency dividing unit 325 included in the classification unit 32 uniformly divides the Nyquist frequency $f_n$ thus calculated in step S5 into 1024 frequency bands, the number of which is the same as that of the filter banks. It should be noted that the 1024 frequency bands thus divided will be referred to as "bands 1 through 1024" hereafter. The lower-limit frequency, the center frequency k, and the upper-limit frequency are shown in Table 3 for each of the bands 1 through 36, which are a part of the 1024 frequency bands thus calculated in this processing.

TABLE 3

| BAND | LOWER-LIMIT FREQUENCY [Hz] | CENTER FREQUENCY k [Hz] | UPPER-LIMIT FREQUENCY [Hz] |
| --- | --- | --- | --- |
| 1 | 0.000 | 5.383 | 10.767 |
| 2 | 10.767 | 16.150 | 21.533 |
| 3 | 21.533 | 26.917 | 32.300 |
| 4 | 32.300 | 37.683 | 43.066 |

TABLE 3-continued

| BAND | LOWER-LIMIT FREQUENCY [Hz] | CENTER FREQUENCY k [Hz] | UPPER-LIMIT FREQUENCY [Hz] |
|---|---|---|---|
| 5 | 43.066 | 48.450 | 53.833 |
| 6 | 53.833 | 59.216 | 64.600 |
| 7 | 64.600 | 69.983 | 75.366 |
| 8 | 75.366 | 80.750 | 86.133 |
| 9 | 86.133 | 91.516 | 96.899 |
| 10 | 96.899 | 102.283 | 107.666 |
| 11 | 107.666 | 113.049 | 118.433 |
| 12 | 118.433 | 123.816 | 129.199 |
| 13 | 129.199 | 134.583 | 139.966 |
| 14 | 139.966 | 145.349 | 150.732 |
| 15 | 150.732 | 156.116 | 161.499 |
| 16 | 161.499 | 166.882 | 172.266 |
| 17 | 172.266 | 177.649 | 183.032 |
| 18 | 183.032 | 188.416 | 193.799 |
| 19 | 193.799 | 199.182 | 204.565 |
| 20 | 204.565 | 209.949 | 215.332 |
| 21 | 215.332 | 220.715 | 226.099 |
| 22 | 226.099 | 231.482 | 236.865 |
| 23 | 236.865 | 242.249 | 247.632 |
| 24 | 247.632 | 253.015 | 258.398 |
| 25 | 258.398 | 263.782 | 269.165 |
| 26 | 269.165 | 274.548 | 279.932 |
| 27 | 279.932 | 285.315 | 290.698 |
| 28 | 290.698 | 296.082 | 301.465 |
| 29 | 301.465 | 306.848 | 312.231 |
| 30 | 312.231 | 317.615 | 322.998 |
| 31 | 322.998 | 328.381 | 333.765 |
| 32 | 333.765 | 339.148 | 344.531 |
| 33 | 344.531 | 349.915 | 355.298 |
| 34 | 355.298 | 360.681 | 366.064 |
| 35 | 366.064 | 371.448 | 376.831 |
| 36 | 376.831 | 382.214 | 387.598 |

In Step S7, the center frequency classification unit 326 included in the classification unit 32 classifies the center frequencies k of the 1024 frequency bands divided in Step S6 into twelve classes, which is the same as the number of the Mel filter banks, by classifying into regions each of which is defined by the minimum value $K_{lo}$ and the maximum value $k_{hi}$ of the original frequency. Referring to Table 2 and Table 3, the regions of the original frequencies, which correspond to the Mel band 1 and each of which is defined by the minimum value $K_{lo}$ and the maximum value $k_{hi}$, include the center frequencies k of the frequency bands that correspond to the bands 1 through 35. Accordingly, with this processing, of the center frequencies k of the 1024 frequency bands, the center frequencies k of those that correspond to the bands 1 through 35, are classified into a single Mel filter bank.

In Step S8, the MDCT coefficient classification unit 327 included in the classification unit 32 classifies the 1024 MDCT coefficients, which have been extracted in Step S1 and the number of which is the same as that of the filter banks, into twelve classes, which is the same as the number of the Mel filter banks, by associating each MDCT coefficient with a corresponding one from among the twelve center frequencies k which have been classified in Step S7 and the number of which is the same as that of the Mel filter banks. It should be noted that the band width of the Mel filter bank is increased according to an increase in the frequency. Accordingly, the number of the MDCT coefficients included in the Mel band is increased according to an increase in the identification number of the Mel band.

In Step S9, the integrating unit 33 extracts the MDCT coefficients by applying a predetermined window function W(k;l) to the MDCT coefficients thus classified into the twelve classes in Step S8, and integrates the MDCT coefficients thus extracted, in increments of the Mel filter banks.

Figure 6:
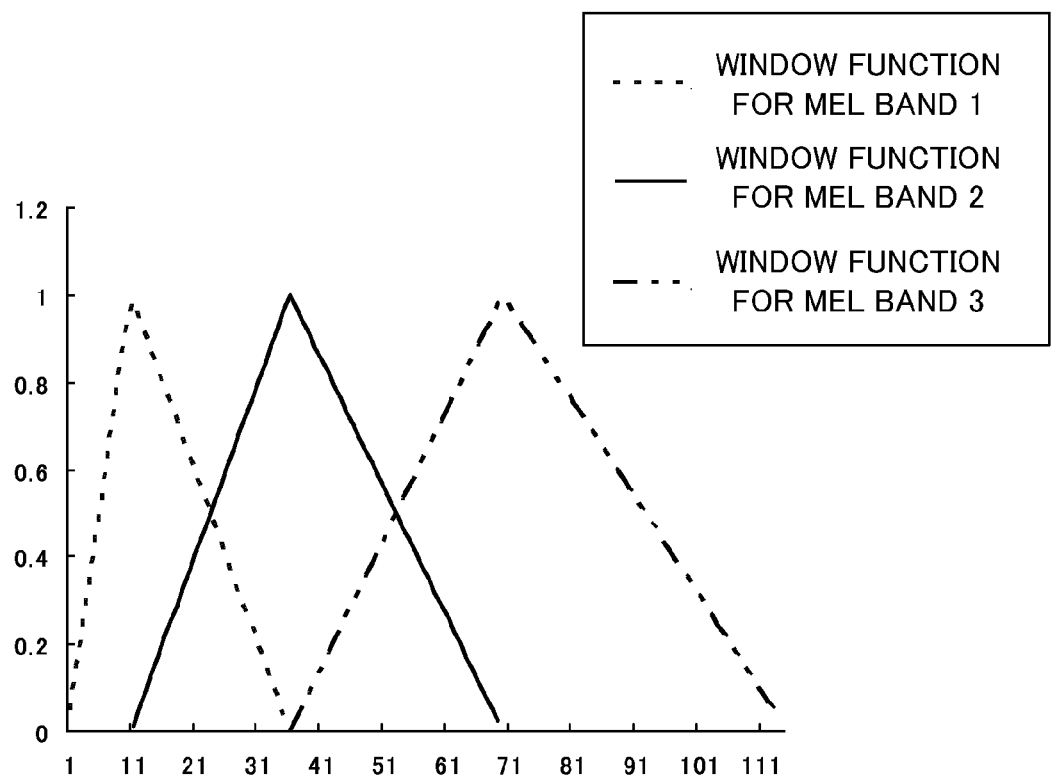
FIG. 6 is a diagram for describing a window function used by the feature extraction unit.

Here, the predetermined window function W(k;l) is calculated by the following Expression (7) using the minimum value $K_{lo}$, the median k and the maximum value $k_{hi}$ of the original frequency. FIG. 6 shows the window function W(k;1) for the Mel band 1, the window function W(k;2) for the Mel band 2, and the window function W(k;3) for the Mel band 3.

[Expression 7]

$$W(k; l) = \begin{cases} \dfrac{k - k_{lo}(l)}{k_c(l) - k_{lo}(l)} & k_{lo}(l) \le k \le k_c(l) \\ \dfrac{k_{hi}(l) - k}{k_{hi}(l) - k_c(l)} & k_c(l) \le k \le k_{hi}(l) \end{cases} \quad (7)$$

In Step S10, the feature calculation unit 34 calculates the coefficients of the MFCC by performing logarithmic cosine conversion of the integrated results obtained in Step S9. Furthermore, lower-order twelve MFCC coefficients thus calculated are used as the feature value. Here, the i'th MFCC coefficient $C_{mfcc}(i)$ is calculated by the following Expression (8).

[Expression 8]

$$C_{mfcc}(i) = \sqrt{\dfrac{2}{N}} \sum_{l=1}^{L} \log m(l) \cos\left\{\left(l - \dfrac{1}{2}\right)\dfrac{i\pi}{L}\right\} \quad (8)$$

Here, "i" represents an integer which satisfies the following Expression: $1 \le i \le 12$, and "N" represents an integer which is equal to the maximum value of i, i.e., 12. It is not necessary for N and L to be the same value. It is sufficient that N and L satisfy the following Expression: $N \le L$.

With m(l) as the MDCT coefficient thus extracted in Step S9, and with M(k) as the MDCT coefficient at the center frequency k, the MDCT coefficient m(l) is represented by the following Expression (9).

[Expression 9]

$$m(l) = \sum_{k=lo}^{hi} W(k; l) |M(k)| \quad (9)$$

[Similarity to MFCC]

Figure 7:
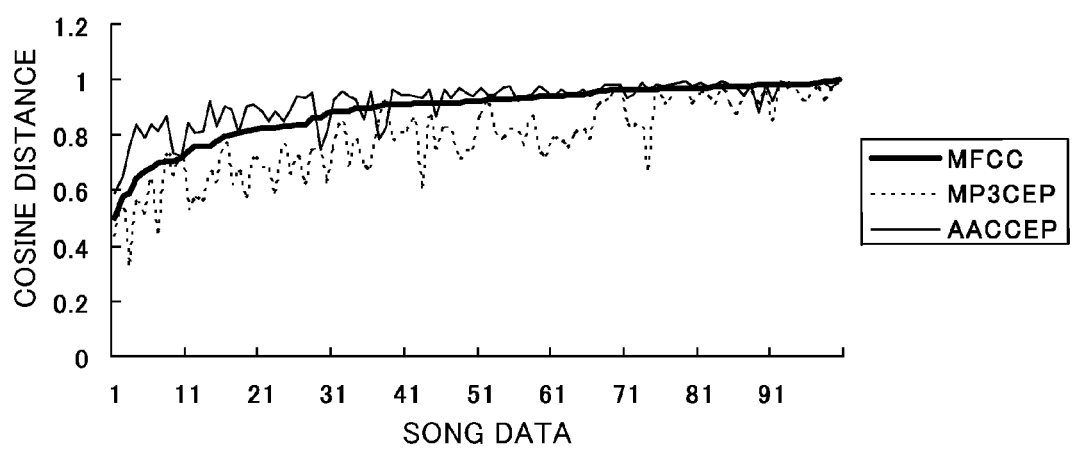
FIG. 7 is a diagram for describing the similar level to the MFCC.

FIG. 7 is a diagram which shows the similarity to the MFCC. The graph for the MFCC shown in FIG. 7 shows the cosine distances between the feature value of particular one song data in the WAVE format and the feature values of predetermined one hundred song data in the WAVE format, in ascending order of the cosine distance. The graph for the MP3CEP shown in FIG. 7 shows the cosine distances between the feature value of the particular one song data in the MP3 format and the feature values of the predetermined one hundred song data in the MP3 format, with the feature values being obtained using a conventional method. The graph for the AACCEP shown in FIG. 7 shows the cosine distances between the feature value of the particular one song data in the AAC format and the feature values of the predetermined one hundred song data in the AAC format, with the feature values being obtained by the aforementioned feature extraction unit 22.

Referring to FIG. 7, the graph for the AACCEP is closer to the graph for the MFCC than the graph for the MP3CEP is.

That is to say, the AACCEP, which is the feature value of the AAC-format song data obtained by the aforementioned feature extraction unit 22, provides search results close to those provided based upon the MFCC which is the feature value of the WAVE-format song data, as compares with the MP3CEP which is the feature value of the MP3-format song data obtained by conventional methods.

As described above, the feature extraction unit 22 performs a series of processing from the Huffman code processing up to the TNS processing, which is a part of a series of processing shown in FIG. 3 for converting the AAC-format song data into the WAVE-format song data. That is to say, the IMDCT processing is not performed after the extraction of the MDCT coefficients from the song data input in the AAC format. Instead, at the point in time immediately after the MDCT coefficients have been extracted from the AAC-format song data by the MDCT coefficient extraction unit 31, the subsequent processing is started by the classification unit 32, the integrating unit 33, and the feature calculation unit 34. Thus, such an arrangement reduces the time required to calculate the AACCEP for the AAC-format song data, as compared with conventional techniques in which the entire series of processing shown in FIG. 3, including the IMDCT processing, must be performed for converting the AAC-format song data into the WAVE-format song data. Furthermore, such an arrangement does not perform the IMDCT processing, and accordingly, the song data in the AAC format is not converted into the song data in the WAVE format. Thus, such an arrangement does not require additional storage capacity for storing the converted song data, thereby reducing storage capacity required to calculate the AACCEP for the AAC-format song data.

Furthermore, with the aforementioned feature extraction unit 22, high-frequency enhancement is performed by multiplying each MDCAT coefficient M(j) by a predetermined coefficient, as represented by Expression (2) and Expression (3). Thus, such an arrangement is capable of performing high-frequency enhancement for the AAC-format song data without converting it into uncompressed PCM format song data. Such an arrangement provides a high-precision feature value as compared with an arrangement in which high-frequency enhancement is not performed.

Furthermore, the aforementioned song search apparatus 20 includes the song database 21, the feature extraction unit 22, and the song feature database 23. With such an arrangement, the feature extraction unit 22 obtains the AACCEP for each song data stored in the AAC format in the song database 21, and calculates the feature vector for the AACCEP thus obtained. The song feature database 23 stores the feature vectors thus calculated.

Furthermore, the aforementioned song search system 1 includes the terminal 10 and the song search apparatus 20. Thus, the song search system 1 is capable of searching multiple AAC-format song data stored in the song database 21 for the song data in which the distance between the feature vector thereof and the feature vector calculated for the song data selected by the user via the terminal 10 is equal to or smaller than a predetermined value, i.e., the song data similar to the song data thus selected by the user.

Also, an arrangement may be made in which the processing performed by the song search apparatus 20 according to the present invention is stored in a computer-readable storage medium, and the song search apparatus 20 reads out and executes the program thus stored in the storage medium, which also realizes the present invention.

Also, the aforementioned program may be transmitted from the song search apparatus 20, which includes a storage device or the like which stores this program, to another computer system via a transmission medium or by transmission waves propagated via a transmission medium. Here, the "transmission medium" as used here, via which a program is transmitted, represents a medium which provides a function of transmitting information, examples of which include a network (communication network) such as the Internet etc., and a communication link (communication line) such as a telephone line etc.

Also, the aforementioned program may provide a part of the aforementioned functions. Also, the aforementioned program may function by making a combination with another program which has already been stored in the song search apparatus 20. That is to say, the aforementioned program may be a so-called difference file (difference program).

Detailed description has been made with reference to the drawings regarding an embodiment of the present invention. The specific configuration is not restricted to such an embodiment. Rather, other designs or the like may be made without departing from the scope and the spirit of the present invention.

REFERENCE SIGNS LIST 1 song search system
10 terminal
20 song search apparatus
22 feature extraction unit
31 MDCT coefficient extraction unit
32 classification unit
33 integrating unit
34 feature calculation unit
321 Mel frequency calculation unit
322 Mel frequency dividing unit
323 original frequency calculation unit
324 Nyquist frequency calculation unit
325 Nyquist frequency dividing unit
326 center frequency dividing unit
327 MDCT coefficient classification unit

CITATION LIST

[Non-Patent Literature 1]
"FEATURE SPACE MODIFICATION FOR CONTENT-BASED MUSIC RETRIEVAL BASED ON USER PREFERENCES", Keiichiro Hoashi, 517-520, ICASSP 2006
[Non-Patent Literature 2]
http://htk.eng.cam.ac.uk/
[Non-Patent Literature 3]
"Content-Based Methods for the Management of Digital Music", David Pye, ICASSP, Proceedings of the Acoustics, Speech, and Signal Processing, 2000. on IEEE International Conference—Volume 04

The invention claimed is:
1. A feature extraction apparatus which acquires a feature value for AAC-format song data, the feature extraction apparatus including:
   an MDCT coefficient extraction unit which extracts MDCT coefficients from the AAC-format song data, the AAC-format song data being stored on a storage unit;
   a classification unit which locates the MDCT coefficients thus extracted by the MDCT coefficient extraction unit on Mel frequency regions so as to uniformly classify the MDCT coefficients into classes, the number of which is the same as that of a predetermined number of Mel filter banks;

an integrating unit which extracts the MDCT coefficients classified by the classification unit by applying a predetermined window function, and integrates the MDCT coefficients thus extracted, in increments of the Mel filter banks; and a feature calculation unit which calculates the feature value by performing logarithmic cosine conversion of the integrated results obtained by the integrating unit;

wherein the classification unit includes:

a Mel frequency calculation unit which converts the sampling frequency for the AAC-format song data into a Mel scale, thereby obtaining a Mel frequency, a Mel frequency dividing unit which divides the Mel frequency into the same number of classes as that of the Mel filter banks, and calculates the minimum value and the maximum value for each of the Mel frequencies thus divided, an original frequency calculation unit which converts the minimum value and the maximum value of each Mel frequency calculated by the Mel frequency dividing unit into a linear scale, thereby obtaining the minimum value and the maximum value for each original frequency;

an upper-limit frequency calculation unit which calculates the upper-limit frequency based upon the sampling frequency for the AAC-format song data, an upper-limit frequency dividing unit which uniformly divides the upper-limit frequency calculated by the upper-limit frequency calculation unit into frequency bands, the number of which is the same as a predetermined number of filter banks, a center frequency classification unit which classifies the center frequencies of the frequency bands into regions each of which is defined by the minimum value and the maximum value of the original frequency, thereby classifying the center frequencies into the same number of classes as that of the Mel filter banks, and an MDCT coefficient classification unit which classifies the MDCT coefficients, which have been extracted by the MDCT coefficient extraction unit and the number of which is the same as that of the filter banks, into the same number of classes as that of the Mel filter banks, by associating each MDCT coefficient with a corresponding one of the center frequencies which have been classified by the center frequency classification unit into the same number of classes as that of the Mel filter banks; and wherein the integrating unit extracts the MDCT coefficients classified by the MDCT coefficient classification unit by applying the predetermined window function, and integrates the MDCT coefficients thus extracted, in increments of the Mel filter banks.

2. A feature extraction apparatus according to claim 1, wherein the MDCT coefficient extraction unit performs processing in which the MDCT coefficients are extracted from the AAC-format song data, which is a part of multiple processes for converting the AAC-format song data into uncompressed PCM-format song data.

3. A feature extraction apparatus according to claim 1, wherein, after each of the MDCT coefficients classified by the MDCT coefficient classification unit is multiplied by a predetermined coefficient so as to perform high-frequency enhancement, the integrating unit extracts the MDCT coefficients thus subjected to the high-frequency enhancement by applying the predetermined window function, and integrates the MDCT coefficients thus extracted, in increments of the Mel filter banks.

4. A feature database creating apparatus including:
a feature extraction apparatus according to claim 1;
a song data storage unit which stores multiple song data in the AAC format; and
a feature storage unit which obtains the feature value of each of multiple AAC-format song data stored in the song data storage unit, and stores the feature values thus obtained.

5. A song search system including:
a song data selection receiving unit which receives the song data selected by the user from among multiple AAC-format song data stored in a song data storage unit;
a feature vector creating unit which calculates a feature vector for a feature value stored in a feature storage unit;
a specific feature vector search unit which searches the feature vectors obtained by the feature vector creating unit for a specific feature vector in which the distance between the feature vector thereof and the feature vector of the song data which has been selected and received by the song data selection receiving unit is equal to or smaller than a predetermined value;
a song search unit which searches multiple AAC-format song data stored in the song data storage unit for the song data in which the feature vector thereof matches the specific feature vector;
a feature database creating apparatus provided with:
the song data storage unit which stores multiple song data in the AAC format, and
the feature storage unit which obtains the feature value of each of multiple AAC-format song data stored in the song data storage unit, and stores the feature values thus obtained;
a feature database creating apparatus comprising a feature extraction apparatus provided with:
an MDCT coefficient extraction unit which extracts MDCT coefficients from a AAC-format song data,
a classification unit which locates the MDCT coefficients thus extracted by the MDCT coefficient extraction unit on Mel frequency regions so as to uniformly classify the MDCT coefficients into classes, the number of which is the same as that of a predetermined number of Mel filter banks,
an integrating unit which extracts the MDCT coefficients classified by the classification unit by applying a predetermined window function, and integrates the MDCT coefficients thus extracted, in increments of the Mel filter banks, and
a feature calculation unit which calculates the feature value by performing logarithmic cosine conversion of the integrated results obtained by the integrating unit,
wherein the classification unit includes:
a Mel frequency calculation unit which converts the sampling frequency for the AAC-format song data into a Mel scale, thereby obtaining a Mel frequency,
a Mel frequency dividing unit which divides the Mel frequency into the same number of classes as that of the Mel filter banks, and calculates the minimum value and the maximum value for each of the Mel frequencies thus divided,
an original frequency calculation unit which converts the minimum value and the maximum value of each Mel frequency calculated by the Mel frequency dividing unit into a linear scale, thereby obtaining the minimum value and the maximum value for each original frequency;
an upper-limit frequency calculation unit which calculates the upper-limit frequency based upon the sampling frequency for the AAC-format song data, an upper-limit frequency dividing unit which uniformly divides the upper-limit frequency calculated by the upper-limit frequency calculation unit into frequency bands, the number of which is the same as a predetermined number of filter banks, a center frequency classification unit which classifies the center frequencies of the frequency bands into regions each of which is defined by the minimum value and the maximum value of the original frequency, thereby classifying the center frequencies into the same number of classes as that of the Mel filter banks, and an MDCT coefficient classification unit which classifies the MDCT coefficients, which have been extracted by the MDCT coefficient extraction unit and the number of which is the same as that of the filter banks, into the same number of classes as that of the Mel filter banks, by associating each MDCT coefficient with a corresponding one of the center frequencies which have been classified by the center frequency classification unit into the same number of classes as that of the Mel filter banks; and wherein the integrating unit extracts the MDCT coefficients classified by the MDCT coefficient classification unit by applying the predetermined window function, and integrates the MDCT coefficients thus extracted, in increments of the Mel filter banks.

6. A feature extraction method for acquiring a feature value for AAC-format song data, including:

a first step for extracting MDCT coefficients from the AAC-format song data;

a second step for locating the MDCT coefficients thus extracted in the first step on Mel frequency regions so as to uniformly classify the MDCT coefficients into classes, the number of which is the same as that of a predetermined number of Mel filter banks;

a third step for extracting the MDCT coefficients classified in the second step by applying a predetermined window function, and integrating the MDCT coefficients thus extracted, in increments of the Mel filter banks; and a fourth step for calculating the feature value by performing logarithmic cosine conversion of the integrated results obtained in the third step;

wherein the second step includes:

a fifth step for converting the sampling frequency for the AAC-format song data into a Mel scale, thereby obtaining a Mel frequency, a sixth step for dividing the Mel frequency into the same number of classes as that of the Mel filter banks, and calculating the minimum value and the maximum value for each of the Mel frequencies thus divided, a seventh step for converting the minimum value and the maximum value of each Mel frequency calculated in the sixth step into a linear scale, thereby obtaining the minimum value and the maximum value for each original frequency, an eighth step for calculating the upper-limit frequency based upon the sampling frequency for the AAC-format song data, a ninth step for uniformly dividing the upper-limit frequency calculated in the eighth step into frequency bands, the number of which is the same as a predetermined number of filter banks, a tenth step for classifying the center frequencies of the frequency bands into regions each of which is defined by the minimum value and the maximum value of the original frequency, thereby classifying the center frequencies into the same number of classes as that of the Mel filter banks, and an eleventh step for classifying the MDCT coefficients, which have been extracted in the first step and the number of which is the same as that of the filter banks, into the same number of classes as that of the Mel filter banks, by associating each MDCT coefficient with a corresponding one of the center frequencies which have been classified in the tenth step into the same number of classes as that of the Mel filter banks; and wherein, in the third step, the MDCT coefficients classified in the eleventh step are extracted by applying the predetermined window function, and the MDCT coefficients thus extracted are integrated, in increments of the Mel filter banks.

7. A computer program product which includes a non-transitory computer readable medium having a set of instructions stored thereon which instructs a computer to execute a feature extraction method for acquiring a feature value for AAC-format song data, including:

a first step for extracting MDCT coefficients from the AAC-format song data;

a second step for locating the MDCT coefficients thus extracted in the first step on Mel frequency regions so as to uniformly classify the MDCT coefficients into classes, the number of which is the same as that of a predetermined number of Mel filter banks;

a third step for extracting the MDCT coefficients classified in the second step by applying a predetermined window function, and integrating the MDCT coefficients thus extracted, in increments of the Mel filter banks; and a fourth step for calculating the feature value by performing logarithmic cosine conversion of the integrated results obtained in the third step;

wherein the second step includes:

a fifth step for converting the sampling frequency for the AAC-format song data into a Mel scale, thereby obtaining a Mel frequency, a sixth step for dividing the Mel frequency into the same number of classes as that of the Mel filter banks, and calculating the minimum value and the maximum value for each of the Mel frequencies thus divided, a seventh step for converting the minimum value and the maximum value of each Mel frequency calculated in the sixth step into a linear scale, thereby obtaining the minimum value and the maximum value for each original frequency, an eighth step for calculating the upper-limit frequency based upon the sampling frequency for the AAC-format song data, a ninth step for uniformly dividing the upper-limit frequency calculated in the eighth step into frequency bands, the number of which is the same as a predetermined number of filter banks, a tenth step for classifying the center frequencies of the frequency bands into regions each of which is defined by the minimum value and the maximum value of the original frequency, thereby classifying the center frequencies into the same number of classes as that of the Mel filter banks, and an eleventh step for classifying the MDCT coefficients, which have been extracted in the first step and the number of which is the same as that of the filter banks, into the same number of classes as that of the Mel filter banks, by associating each MDCT coefficient with a corresponding one of the center frequencies which have been classified in the tenth step into the same number of classes as that of the Mel filter banks; and wherein, in the third step, the MDCT coefficients classified in the eleventh step are extracted by applying the predetermined window function, and the MDCT coefficients thus extracted are integrated, in increments of the Mel filter banks.

* * * * *